Dec. 1, 1953 W. SARAGA 2,661,458

PHASE SPLITTING NETWORK

Filed June 21, 1950 14 Sheets-Sheet 1

Inventor:
Wolja Saraga,
By: Pierce, Scheffler & Parker,
Attorneys.

Dec. 1, 1953 W. SARAGA 2,661,458

PHASE SPLITTING NETWORK

Filed June 21, 1950 14 Sheets-Sheet 2

Inventor:
Wolja Saraga,
By: Pierce, Scheffler & Parker,
Attorneys.

Dec. 1, 1953 W. SARAGA 2,661,458

PHASE SPLITTING NETWORK

Filed June 21, 1950 14 Sheets-Sheet 3

Inventor:
Wolja Saraga,
By: Pierce, Scheffler & Parker,
Attorneys.

Dec. 1, 1953 W. SARAGA 2,661,458

PHASE SPLITTING NETWORK

Filed June 21, 1950 14 Sheets-Sheet 4

Inventor:
Wolja Saraga,
By: Pierce, Scheffler & Parker,
Attorneys.

Dec. 1, 1953 W. SARAGA 2,661,458

PHASE SPLITTING NETWORK

Filed June 21, 1950 14 Sheets-Sheet 5 x →

Inventor:
Wolja Saraga,
By Pierce, Scheffler & Parker,
Attorneys.

Dec. 1, 1953 W. SARAGA 2,661,458

PHASE SPLITTING NETWORK

Filed June 21, 1950 14 Sheets-Sheet 6

Inventor:
Wolja Saraga,
By: Pierce, Scheffler & Parker,
Attorneys.

$$\frac{y_n}{\sqrt{\lambda}} = sn\left(\frac{u}{M_n}, \lambda\right) \qquad (10a)$$

$$\frac{x}{\sqrt{k}} = sn(u, k) \qquad (10b)$$

$$M_n = \frac{K}{\Lambda} \quad \frac{K'}{n\Lambda'}$$

X AS A FUNCTION OF $u = u_1 + ju_2$ IS DESCRIBED BY THE FOLLOWING TABLE AND DIAGRAM

| | | | | |
|---|---|---|---|---|
| $x$ | $0 \cdots\cdots \sqrt{k}$ | $\sqrt{k} \cdots\cdots 1$ | $1 \cdots\cdots 1/\sqrt{k}$ | $1/\sqrt{k} \cdots\cdots \infty$ |
| $u_1$ | $0 \cdots\cdots K$ | $K$ | $K$ | $K \cdots\cdots 0$ |
| $u_2$ | $0$ | $0 \cdots\cdots \frac{1}{2}K'$ | $\frac{1}{2}K' \cdots\cdots K'$ | $K'$ |

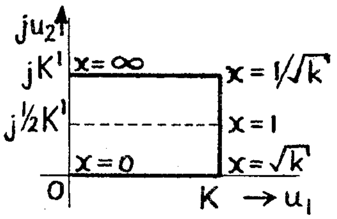

BEST FORM OF (10b)

FOR $x = 0 \cdots\cdots \sqrt{k}$ $\quad x/\sqrt{k} = sn(u_1, k)$, $u_2 = 0$

FOR $x = \sqrt{k} \cdots\cdots 1/\sqrt{k}$ $\quad x/\sqrt{k} = 1/dn(u_2, k')$, $u_1 = K$, $k' = \sqrt{1-k^2}$ FOR $x = 1/\sqrt{k} \cdots\cdots \infty$ $\quad x/\sqrt{k} = 1/k\, sn(u_1, k)$, $u_2 = K'$ BEST FORM OF EXPRESSION GIVING $y$ AS A FUNCTION OF $x$ IF $x = \sqrt{k} \cdots\cdots 1/\sqrt{k}$ $$\frac{y}{\sqrt{\lambda}} = \frac{1}{dn\left[\frac{1}{M_n} dn^{-1}\left(\frac{\sqrt{k}}{x}, k'\right), \lambda'\right]}, \qquad \lambda' = \sqrt{1-\lambda^2}$$

FIG. 8.

Inventor:
Wolja Saraga,
By Pierce, Scheffler & Parker,
Attorneys.

Dec. 1, 1953 W. SARAGA 2,661,458
PHASE SPLITTING NETWORK
Filed June 21, 1950 14 Sheets-Sheet 8

$$\frac{y_n}{\sqrt{\lambda}} = sn\left(\frac{u}{M_n}, \lambda\right) \qquad \frac{x}{\sqrt{k}} = sn(u,k)$$

$$x = \sqrt{k}\, sn\left\{\left[M_n\, sn^{-1}\left(\frac{y_n}{\sqrt{\lambda}}, \lambda\right) + j2q\frac{K'}{n}\right], k\right\} \quad , \quad q = 0,1,2,3,\ldots\ldots(n-1).$$

LET $M_n\, sn^{-1}\left(\frac{y_n}{\sqrt{\lambda}}, \lambda\right) = T$ , THEN

| $y_n$ | T | x |
|---|---|---|
| 0 | 0 | $j\sqrt{k}\,sc\left[2q\frac{K'}{n}, k'\right]$ |
| j | $j\frac{1}{2}\frac{K'}{n}$ | $j\sqrt{k}\,sc\left[(\frac{1}{2}+2q)\frac{K'}{n}, k'\right]$ |
| $\infty$ | $j\frac{K'}{n}$ | $j\sqrt{k}\,sc\left[(1+2q)\frac{K'}{n}, k'\right]$ |
| $-j$ | $j\frac{3}{2}\frac{K'}{n}$ | $j\sqrt{k}\,sc\left[(\frac{3}{2}+2q)\frac{K'}{n}, k'\right]$ |
| $\sqrt{\lambda}$ | K | $\sqrt{k}\,nd\left[2q\frac{K'}{n}, k'\right]$ |
| 1 | $K+j\frac{K'}{n}(\frac{1}{2}\text{ OR }\frac{3}{2})$ | $\sqrt{k}\,nd\left[(\frac{1}{2}+q)\frac{K'}{n}, k'\right]$ |
| $1/\sqrt{\lambda}$ | $K+j\frac{K'}{n}$ | $\sqrt{k}\,nd\left[(1+2q)\frac{K'}{n}, k'\right]$ |

$$sc(u,k) = \frac{sn(u,k)}{cn(u,k)} \quad , \qquad nd(u,k) = \frac{1}{dn(u,k)}$$

FIG. 9.

Inventor:
Wolja Saraga,
By: Pierce, Scheffler & Parker,
Attorneys.

| n = 1 | |
|---|---|
| $x$ | $y_1$ |
| 0 | 0 |
| +j | +j |
| $\pm\infty$ | $\pm\infty$ |
| −j | −j |
| 0 | 0 |

| n = 2 | |
|---|---|
| $x$ | $y_2$ |
| $j\sqrt{k}\,sc(0) = 0$ | 0 |
| $j\sqrt{k}\,sc(\frac{K'}{4}, k')$ | +j |
| $j\sqrt{k}\,sc(\frac{K'}{2}, k') = +j$ | $\pm\infty$ |
| $j\sqrt{k}\,sc(\frac{3}{4}K', k')$ | −j |
| $j\sqrt{k}\,sc(K', k') = \infty$ | 0 |
| $j\sqrt{k}\,sc(\frac{5}{4}K', k')$ | +j |
| $j\sqrt{k}\,sc(\frac{3}{2}K', k') = -j$ | $\pm\infty$ |
| $j\sqrt{k}\,sc(\frac{7}{4}K', k')$ | −j |
| $j\sqrt{k}\,sc(0) = 0$ | 0 |

| n = 3 | |
|---|---|
| $x$ | $y_3$ |
| $j\sqrt{k}\,sc(0) = 0$ | 0 |
| $j\sqrt{k}\,sc(\frac{K'}{6}, k')$ | +j |
| $j\sqrt{k}\,sc(\frac{K'}{3}, k')$ | $\pm\infty$ |
| $j\sqrt{k}\,sc(\frac{K'}{2}, k') = +j$ | −j |
| $j\sqrt{k}\,sc(\frac{2}{3}K', k')$ | 0 |
| $j\sqrt{k}\,sc(\frac{5}{6}K', k')$ | +j |
| $j\sqrt{k}\,sc(K', k') = \infty$ | $\pm\infty$ |
| $j\sqrt{k}\,sc(\frac{7}{6}K', k')$ | −j |
| $j\sqrt{k}\,sc(\frac{4}{3}K', k')$ | 0 |
| $j\sqrt{k}\,sc(\frac{3}{2}K', k') = -j$ | +j |
| $j\sqrt{k}\,sc(\frac{5}{3}K', k')$ | $\pm\infty$ |
| $j\sqrt{k}\,sc(\frac{11}{6}K', k')$ | −j |
| $j\sqrt{k}\,sc(0) = 0$ | 0 |

$$sc(u,k) = \frac{sn(u,k)}{cn(u,k)} = sc(u+2K,k)$$

$$sc(2K-u,k) = sc(-u,k) = -sc(u,k)$$

| IN THE GENERAL CASE | |
|---|---|
| $x$ | $y_n$ |
| $j\sqrt{k}\,sc(0) = 0$ | 0 |
| $j\sqrt{k}\,sc(\frac{1}{2n}K', k')$ | +j |
| $j\sqrt{k}\,sc(\frac{2}{2n}K', k')$ | $\pm\infty$ |
| $j\sqrt{k}\,sc(\frac{3}{2n}K', k')$ | −j |

FIG. 10.

Inventor:
Wolja Saraga,
By: Pierce, Scheffler & Parker,
Attorneys.

| n = 1 | |
|---|---|
| x | $y_1$ |
| $\sqrt{k}$ | MIN |
| 1 | 1 |
| $1/\sqrt{k}$ | MAX |

| n = 2 | |
|---|---|
| x | $y_2$ |
| $x_1=\sqrt{k}\,nd(0)=\sqrt{k}$ | MIN |
| $x_2=\sqrt{k}\,nd(\tfrac{1}{4}K',k')$ | 1 |
| $x_3=\sqrt{k}\,nd(\tfrac{2}{4}K',k')=1$ | MAX |
| $1/x_2=\sqrt{k}\,nd(\tfrac{3}{4}K',k')$ | 1 |
| $1/x_1=\sqrt{k}\,nd(\tfrac{4}{4}K',k')=1/\sqrt{k}$ | MIN |

| n = 3 | |
|---|---|
| x | $y_3$ |
| $x_1=\sqrt{k}\,nd(0)=\sqrt{k}$ | MIN |
| $x_2=\sqrt{k}\,nd(\tfrac{1}{6}K',k')$ | 1 |
| $x_3=\sqrt{k}\,nd(\tfrac{2}{6}K',k')$ | MAX |
| $x_4=\sqrt{k}\,nd(\tfrac{3}{6}K'k')=1$ | 1 |
| $1/x_3=\sqrt{k}\,nd(\tfrac{4}{6}K',k')$ | MIN |
| $1/x_2=\sqrt{k}\,nd(\tfrac{5}{6}K',k')$ | 1 |
| $1/x_1=\sqrt{k}\,nd(\tfrac{6}{6}K',k')=1/\sqrt{k}$ | MAX |

| IN THE GENERAL CASE | |
|---|---|
| x | $y_n$ |
| $x_1=\sqrt{k}\,nd(0)=\sqrt{k}$ | MIN |
| $x_2=\sqrt{k}\,nd(\tfrac{1}{2n}K',k')$ | 1 |
| $x_3=\sqrt{k}\,nd(\tfrac{2}{2n}K',k')$ | MAX |
| $x_4=\sqrt{k}\,nd(\tfrac{3}{2n}K',k')$ | 1 |
| ⋮ | ⋮ |

$$nd(u,k)=1/dn(u,k)=nd(-u,k)$$

$$nd(u+2K,k)=nd(u,k)$$

$$nd(K'\pm u,k')=1/[k\,nd(u,k')]$$

FIG. 11.

Inventor:
Wolja Saraga,
By: Pierce, Scheffler & Parker
Attorneys.

| $x$ | $y_2=\frac{d_2x}{1+x^2}$ | $y_4=\frac{d_4y_2}{1+y_2^2}$ | $y_8=\frac{d_8y_4}{1+y_4^2}$ |
|---|---|---|---|
| $\sqrt{k}$ | MIN | MIN | MIN |
| $F\{d_2/F[d_4/F(d_8)]\}$ | $F[d_4/F(d_8)]$ | $F(d_8)$ | 1 |
| $F[d_2/F(d_4)]$ | $F(d_4)$ | 1 | MAX |
| $F\{d_2/F[d_4F(d_8)]\}$ | $F[d_4F(d_8)]$ | $1/F(d_8)$ | 1 |
| $F(d_2)$ | 1 | MAX | MIN |
| $F\{d_2F[d_4F(d_8)]\}$ | $1/F[d_4F(d_8)]$ | $1/F(d_8)$ | 1 |
| $F[d_2F(d_4)]$ | $1/F(d_4)$ | 1 | MAX |
| $F\{d_2F[d_4/F(d_8)]\}$ | $1/F[d_4/F(d_8)]$ | $F(d_8)$ | 1 |
| 1 | MAX | MIN | MIN |
| $1/F\{d_2F[d_4/F(d_8)]\}$ | $1/F[d_4/F(d_8)]$ | $F(d_8)$ | 1 |
| $1/F[d_2F(d_4)]$ | $1/F(d_4)$ | 1 | MAX |
| $1/F\{d_2F[d_4F(d_8)]\}$ | $1/F[d_4F(d_8)]$ | $1/F(d_8)$ | 1 |
| $1/F(d_2)$ | 1 | MAX | MIN |
| $1/F\{d_2/F[d_4F(d_8)]\}$ | $F[d_4F(d_8)]$ | $1/F(d_8)$ | 1 |
| $1/F[d_2/F(d_4)]$ | $F(d_4)$ | 1 | MAX |
| $1/F\{d_2/F[d_4/F(d_8)]\}$ | $F[d_4/F(d_8)]$ | $F(d_8)$ | 1 |
| $1/\sqrt{k}$ | MIN | MIN | MIN |
| | MIN $y_2=\sqrt{k_2}$, MAX $y_2=\frac{1}{\sqrt{k_2}}$ | MIN $y_4=\sqrt{k_4}$, MAX $y_4=\frac{1}{\sqrt{k_4}}$ | MIN $y_8=\sqrt{k_8}$, MAX $y_8=\frac{1}{\sqrt{k_8}}$ |

$y_2=+j$ IF $x=[F(d_2/j)]^{\pm 1}$ $y_4=+j$ IF $y_2=[F(d_4/j)]^{\pm 1}$, $x=[F(d_2/y_2)]^{\pm 1}$ $y_8=+j$ IF $y_4=[F(d_8/j)]^{\pm 1}$, $y_2=[F(d_4/y_4)]^{\pm 1}$, $x=[F(d_2/y_2)]^{\pm 1}$ $k_2=\frac{2\sqrt{k}}{1+k}$, $k_4=\frac{2\sqrt{k_2}}{1+k_2}$, $k_8=\frac{2\sqrt{k_4}}{1+k_4}$ $d_2=2/\sqrt{k_2}$, $d_4=2/\sqrt{k_4}$, $d_8=2/\sqrt{k_8}$ DEFINITION OF F: $F(z)=\frac{1}{2}z-\sqrt{(\frac{1}{2}z)^2-1}$ FIG. 12. $1/F(z)=\frac{1}{2}z+\sqrt{(\frac{1}{2}z)^2-1}$ Inventor:
Wolja Saraga
By: Pierce, Scheffler & Parker,
Attorneys.

Dec. 1, 1953

W. SARAGA 2,661,458

PHASE SPLITTING NETWORK

Filed June 21, 1950

14 Sheets-Sheet 12

EQUIVALENT TO CIRCUIT IN FIG. 1

$R_1$, $R_2$ AND $|V_o/V_2|$ AS IN FIG. 16

$R_1$, $R_2$ AND $|V_o/V_2|$ AS IN FIG. 16

Inventor:
Wolja Saraga,
By: Pierce, Scheffler & Parker,
Attorneys.

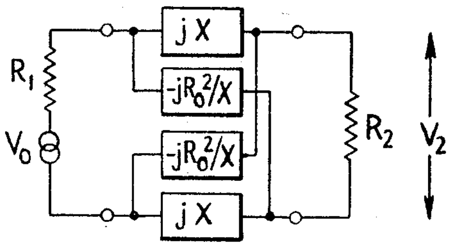

1) $R_1 = R_0 \ , \ R_2 = \eta R_0 ; \quad \left|\frac{V_0}{V_2}\right| = 1 + \frac{1}{\eta}$ 2) $R_2 = R_0 \ , \ R_1 = \frac{1}{\eta} R_0 ; \quad \left|\frac{V_0}{V_2}\right| = 1 + \frac{1}{\eta}$ $\eta$ ARBITRARY

FIG. 14.

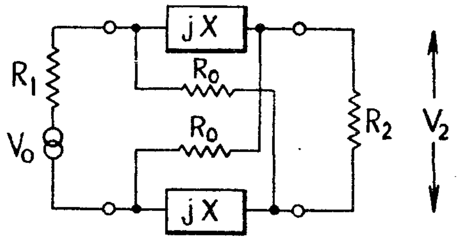

$R_1 = \frac{1}{\eta} R_0 \ , \ R_2 = \eta R_0 ; \quad \left|\frac{V_0}{V_2}\right| = \frac{2 + \eta + 1/\eta}{\eta}$ $\eta$ ARBITRARY

FIG. 15.

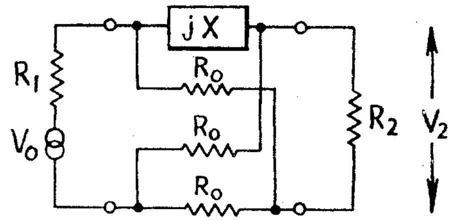

$R_1 = \frac{1}{\eta} R_0 \ , \ R_2 = \eta R_0 ; \quad \left|\frac{V_0}{V_2}\right| = 2 \, \frac{2 + \eta + 1/\eta}{\eta}$ $\eta$ ARBITRARY

FIG. 16.

Inventor:
Wolja Saraga,
By: Pierce, Scheffler & Parker,
Attorneys.

Inventor:
Wolja Saraga,
By: Pierce, Scheffler & Parker,
Attorneys.

Patented Dec. 1, 1953

2,661,458

UNITED STATES PATENT OFFICE 2,661,458

PHASE SPLITTING NETWORK

Wolja Saraga, Petts Wood, Orpington, England, assignor to Telephone Manufacturing Company Limited, London, England, a British company Application June 21, 1950, Serial No. 169,303

Claims priority, application Great Britain June 23, 1949

4 Claims. (Cl. 333—6)

This invention relates to electrical networks of the phase splitting type, and intended to operate over a relatively wide band of frequencies. A phase splitting network is one which, from a single phase input signal produces at least two output signals of different phase. The design of such a network to produce a given phase difference between the outputs is not difficult when the input signal is of a single frequency, but the problem of design is much more difficult where the input signals may lie in a relatively wide frequency band, and particularly if not only constant phase differences but also constant output amplitudes are to be obtained.

Wide band phase splitting networks of this kind are used for instance for single side band modulation, for frequency-shift keying, for polyphase broadcasting, and for the generation of deflection voltages for circular oscillograph traces. An important use of the invention is in single sideband carrier wave transmission systems, in which suppression of one sideband is obtained by combining the outputs of two modulators the input signals and carriers of which have 90° phase difference. The present invention is, however, of wider application and is directed generally to the problem of providing means for obtaining polyphase voltages with constant amplitudes and approximately constant phase differences over a wide frequency band.

In the design of impedance networks including reactances, it is well known and can be demonstrated mathematically that the phase shift difference as a function of frequency cannot be made completely flat over a finite frequency range unless an infinite number of sections are employed; the use of an economically possible number of sections can result only in an approximation to the desired characteristic. The present invention enables the best possible approximation to be obtained when a given number of impedance or reactance elements are used, and in accordance with the invention the impedance elements of the phase splitting network are so chosen that a given condition, which is set out in more particularity hereinafter, is met.

For a complete understanding of the invention, it appears necessary to consider phase splitting networks with any number of design parameters, of any desired bandwidth and of any desired degree of approximation to the ideal performance, and in the following description, and the accompanying drawings this will be dealt with by consideration of the three aspects of network analysis, performance curve approximation and network synthesis.

In these drawings:

Figure 1 is a schematic circuit diagram of a phase splitting network of the general type to which the invention relates, Figure 2 is a schematic circuit diagram of a side band suppression arrangement, being one of the important applications of a network in accordance with the invention, Figure 3 is a diagram showing the effect of a deviation from the required constant phase difference on the side band suppression arrangement in Figure 2, Figure 4 is a graph indicating the nature of a Taylor approximation, Figure 5 is a graph for use when the Taylor form of approximation is employed, Figure 6 is a graph indicating the nature of a Tchebycheff approximation, Figure 7 is a graph for use when the Tchebycheff form of approximation is employed;

Figure 8 is a diagram and table of information for use in manipulating Equations 10*a* and 10*b*, referred to hereinafter;

Figures 9, 10, 11 and 12 are further tables of values for use in evaluating certain functions, as will appear hereinafter;

Figure 13 is a circuit similar to Figure 1,

Figures 14 to 18 are circuits of alternative phase shift networks, and

Figure 1:
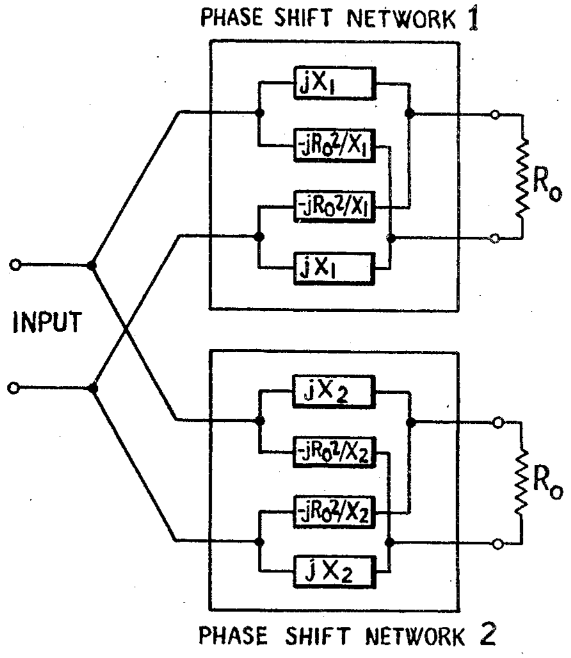

Figure 1 shows schematically a phase splitting circuit consisting of two phase shift networks the inputs of which are in parallel. At this point the phase shift networks are assumed to be conventional all-pass constant resistance single lattice section networks with series arm reactances $X_1$ and $X_2$ and lattice arm reactances $-R_0^2/X_1$ and $-R_0^2/X_2$ respectively. Then the phase shifts $\beta_1$ and $\beta_2$ produced by the networks separately are given by $$\tan \tfrac{1}{2}\beta_1 = X_1/R_0$$

and $$\tan \tfrac{1}{2}\beta_2 = X_2/R_0 \quad (1)$$

so that the phase shift difference $\psi=\beta_1-\beta_2$ is given by $$y=\tan \tfrac{1}{2}\psi=\tan \tfrac{1}{2}(\beta_1-\beta_2)=\frac{X_1/R_0-X_1/R_0}{1+(X_1/R_0)(X_2/R_0)} \quad (2)$$

If $\beta_1-\beta_2=90°$, $y=1$. Thus in an ideal 90° phase splitting circuit $y$ should be unity, over a specified frequency range, or $|\log y|=0$.

Figure 2:
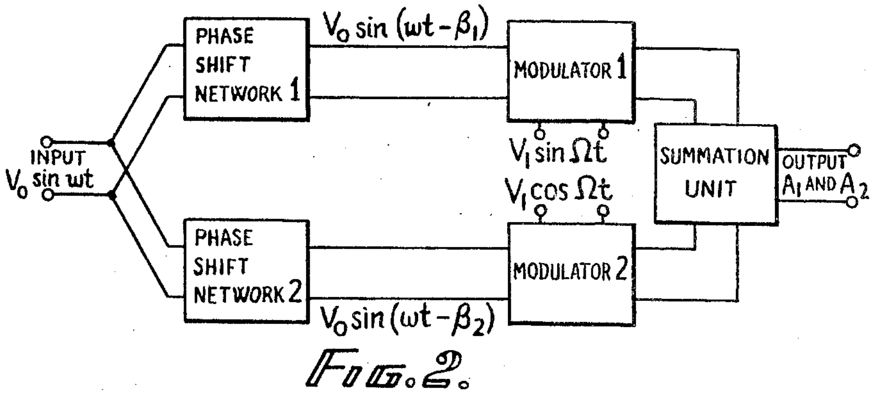

The signficance of deviations of $y$ from unity can only be discussed with reference to a particular application of the phase splitting circuit. It is interesting to consider a single sideband modulator using a phase splitting network, for example of the kind shown in Figure 2. This comprises two phase shift networks of which the inputs are in parallel, and the outputs of which are applied respectively to two modulators, the carrier inputs to which have 90° phase difference. The modulator outputs are applied to a summation unit. If it is assumed that all amplitude and phase relations are exactly as required, as indicated in Figure 2, with the one exception that $y$ is not exactly unity, it can be shown that the amplitude $A_1$ of the wanted sideband and the amplitude $A_2$ of the unwanted sideband are given by $$(L_1)_{db}=20\log_{10}|A_{10}/A_1|=20\log_{10}\sec \tfrac{1}{2}\delta$$
$$=10\log_{10}(1+\tan^2=\tfrac{1}{2}\delta) \quad (3a)$$
$$(L_2)_{db}=20\log_{10}|A_{10}/A_2=20\log_{10}\operatorname{cosec}\tfrac{1}{2}\delta$$
$$=10\log_{10}(1+\cot^2\tfrac{1}{2}\delta) \quad (3b)$$

where $\delta$ is the deviation of the phase difference $\beta_1-\beta_2$ from 90°, i. e.

$$\delta=\beta_1-\beta_2-\frac{\pi}{2} \quad (4)$$

and $A_{10}$ is the value of $A_1$ for $\delta=0$ and $A_{20}$ is the value of $A_2$ for $\delta=0$. If $y$ is given, $\delta$ can be obtained directly from $y$, by means of $$\tan \tfrac{1}{2}\delta=\frac{y-1}{y+1}$$

or $$\sec^2 \tfrac{1}{2}\delta=\frac{2(y^2+1)}{(y+1)^2}$$

or $$\operatorname{cosec}^2 \tfrac{1}{2}\delta=\frac{2(y^2+1)}{(y-1)^2} \quad (5)$$

Figure 3:
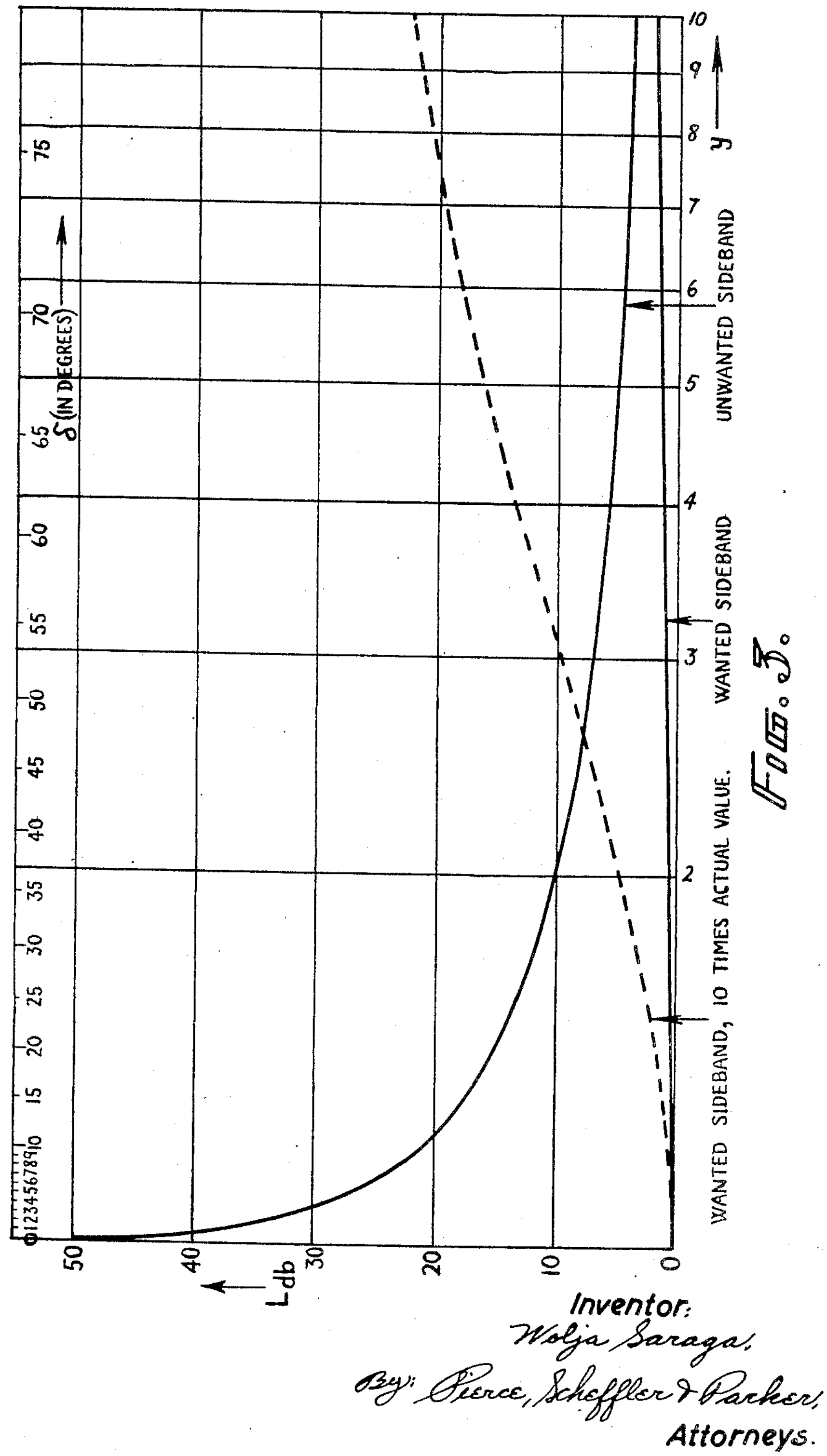

Combining Equations 3a and 3b with 5, $L_1$ and $L_2$ can be obtained as functions of $y$. The result has been plotted in Figure 3. It is important to note that the transformation $$y\rightarrow\frac{1}{y}$$

leaves $L_1$ and $L_2$ unchanged and transforms $\delta$ into $-\delta$.

Equation 2 is very similar to an expression occurring in the evaluation of the insertion loss L of a lattice section filter between a source resistance $R_0$ and a load resistance $R_0$, with series arm reactances $X_A$ and lattice arm reactances $X_B$. Thus, $$L_{db}=10\log_{10}(1+E^2) \quad (6a)$$

$$E=\frac{1+(X_A/R_0)(X_B/R_0)}{(X_A/R_0)-(X_B/R_0)} \quad (6b)$$

It is seen by comparing Equations 6b and 2 that 1/E and $y$ are formed in the same way from reactances $X_A$, $X_B$ and $X_1$, $X_2$ respectively. This similarity has important consequences for the analysis and synthesis of phase splitting networks and will be referred to hereinafter.

*Network analysis*

For the purpose of network analysis and synthesis it is necessary to find the general characteristics of the function $y$ defined by Equation 2 if $y$ is obtained from physical networks. Since $$y=\tan \tfrac{1}{2}(\beta_1-\beta_2)=\frac{\tan \tfrac{1}{2}\beta_1-\tan \tfrac{1}{2}\beta_2}{1+\tan \tfrac{1}{2}\beta_1 \tan \tfrac{1}{2}\beta_2} \quad (7)$$

it is convenient to start with a discussion of the characteristics of $\tan \tfrac{1}{2}\beta_1$ and $\tan \tfrac{1}{2}\beta_2$.

From Equation 1 it follows that $\tan \tfrac{1}{2}\beta_1$ and $\tan \tfrac{1}{2}\beta_2$ as functions of the normalised frequency $x$ have to satisfy Foster's reactance theorem; they have, for instance, to be odd rational functions of $x$; all poles and zeros are simple and occur at real frequencies; zeros and poles are alternating; at $x=0$ and $x=\infty$ no other values than 0 or $x$ are permitted. The degree of denominator and numerator of each expression differs by one.

$y=\tan \tfrac{1}{2}(\beta_1-\beta_2)$ is a function of a less restricted character; like $\tan \tfrac{1}{2}\beta_1$ and $\tan \tfrac{1}{2}\beta_2$ it is an odd rational function of $x$ which is zero or infinity at zero and infinite frequency, but its zeros and poles need not alternate or occur at real frequencies and the degree of denominator and numerator can differ widely.

This follows directly from Equation 7 and is, because of Equation 6b, equally valid for $y$ and 1/E. Dealing now with $y$ only, since it is required that $y$ is approximately equal to unity over a band from say $x=\sqrt{k}$ to $x=1/\sqrt{k}$ it is obviously not permissible to have any poles or zeros of $y$ within this band. On the other hand it has been seen that at $x=0$ and $x=\infty$, $y$ will be 0 or $\infty$ and, therefore, $y$ will tend to deviate more and more from unity for very large and very small values of $x$. It seems plausible therefore to recommend that no poles or zeros should occur at real values of $x$ except at 0 and $\infty$, as such poles or zeros would tend to increase the deviation of $y$ from unity; the poles or zeros at 0 and $\infty$ should be of the first degree and the degree of numerator and denominator must then differ by one. It will be seen hereinafter that Taylor and Tchebycheff approximations lead to expressions which are in agreement with this recommendation.

In what follows, it will be assumed that at $x=0$, $y=0$. (This assumption entails no loss of generality as the only other possible choice is $y=\infty$ at $x=0$. However in this case $1/y$ would be equal to 0 at $x=0$, and then the results of the following discussion could be applied to $1/y$ which approximates unity as closely as does $y$.) Then $y$ will be of the form $$y=Hx\frac{(x^2+c_1^2)(x^2+c_2^2)\ .\ .\ .\ (x^2+c_a^2)}{(x^2+d_1^2)(x^2+d_2^2)\ .\ .\ .\ (x^2+d_b^2)} \quad (8a)$$

where $b-a=0$ or 1, and where the constants $c_1^2$, $c_2^2$ . . . and $d_1^2$, $d_2^2$ . . . and H are real and positive. The highest degree of $x$ occurring in $y$ will be denoted by $n$ and it will be seen later that the order of approximation can be denoted by the same number $n$.

Equation 8a can also be written in the form $$y=x\frac{A_0+A_2x^2+\ .\ .\ .\ +A_{2a}x^{2a}}{1+B_2x^2+\ .\ .\ .\ +B_{2b}x^{2b}} \quad (8b)$$

where all A's and B's are real. An important case arises when $y$ as a function of $\log x$ is symmetrical about $x=1$, i. e. $\log x=0$; the transformation $x \rightarrow 1/x$ then leads to $y \rightarrow 1/y$ if $n$ is odd, but leaves $y$ unchanged if $n$ is even. Expressions for $y_n$ when $y_n$ is symmetrical are listed below for $n$—values from 1 to 6

$$\left.\begin{aligned} &y_1=x;\ y_2=\frac{Hx}{1+x^2};\ y_3=x\frac{a+x^2}{1+ax^2};\ y_4=\frac{Hx(1+x^2)}{(1+ax^2)(1+1/ax^2)} \\ &y_5=x\frac{(a+x^2)(b+x^2)}{(1+ax^2)(1+bx^2)};\ y_6=\frac{Hx(1+ax^2)(1+1/ax^2)}{(1+x^2)(1+bx^2)(1+1/bx^2)} \end{aligned}\right\} \quad (8c)$$

*Approximation of the required performance curve*

It is now proposed to discuss methods for finding values for the constants in the expressions for $y$ (Equations $8a$ or $8b$ or $8c$) such that $y$ becomes a good approximation to unity in the range $x=\sqrt{k}$ to $x=1/\sqrt{k}$. If another value for $y$, say $y=y_0$, is required, $y$ has to be replaced in the discussion that follows by $y/y_0$. Taylor and Tchebycheff approximations will be referred to.

*Taylor approximations*

A Taylor approximation of the $n$-th order is characterised by the fact that there are $n$ design parameters which have been so chosen that for a specified value of $x$, say $x=x_0$, $y$ itself and the first $(n-1)$ differential coefficients $$\frac{d^ry}{dx^r}$$

for $r=1, 2 \ldots (n-1)$ are the same for the required curve and the approximating curve. Thus the approximating curve approaches the required one more and more closely the higher the value of $n$.

If it is assumed that $x_0=1$, then the Taylor approximation of the $n$-th order is given by $$y_n=\tanh n \tanh^{-1} x \qquad (9a)$$

By writing Equation $9a$ in the form $$y_n=\frac{(1+x)^n-(1-x)^n}{(1+x)^n+(1-x)^n} \qquad (9b)$$

it will be seen that the highest degree of $x$ occurring in $y_n$ is $n$ and that $y_n$ is an odd rational function of $x$, symmetrical about $x=1$ against a logarithmic frequency scale. By writing it in the form $$\frac{1-y_n}{1+y_n}=\left(\frac{(1-x)}{(1+x)}\right)^n \qquad (9c)$$

it can easily be proved (putting $y_n=1+\epsilon$ and $x=1+\Delta$) that the first $n-1$ differential coefficients at $x=1$ are zero, as required for a Taylor approximation to $y=1$. It may be convenient to list $y_n$ for $n=1, 2 \ldots 6$.

$$y_1=x;\ y_2=\frac{2x}{1+x^2};\ y_3=\frac{x(3+x^2)}{1+3x^2};\ y_4=\frac{4x(1+x^2)}{1+6x^2+x^4} \qquad (9d)$$

$$y_5=\frac{x(5+10x^2+x^4)}{1+10x^2+5x^4};\ y_6=\frac{2x(3+10x^2+3x^4)}{1+10x^2+15x^4+x^6}$$

Figure 4:
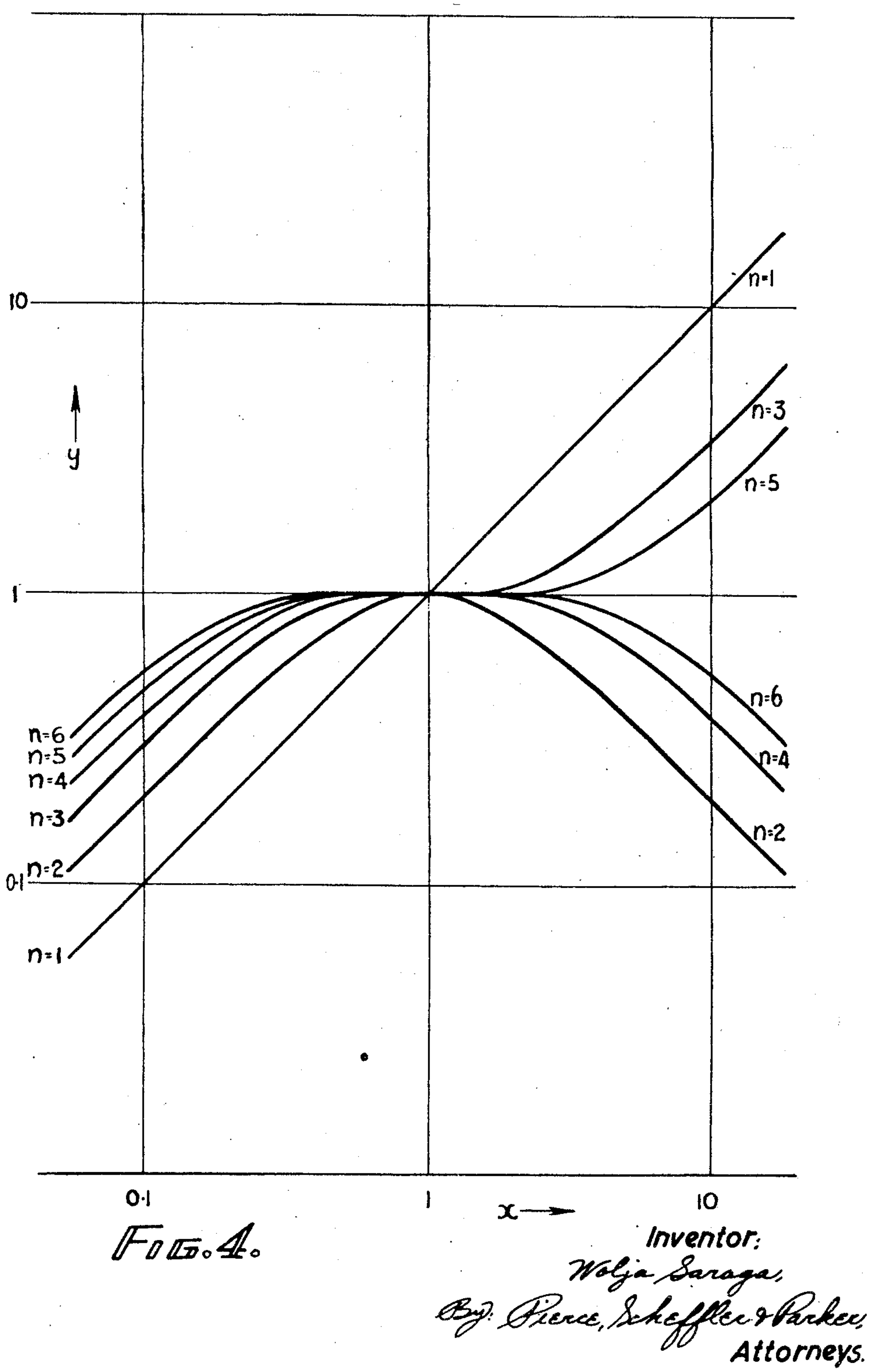

These curves are plotted in Figure 4 on log-log paper, for an $x$-range from $x=\sqrt{k}=\sqrt{0.003}$ to $x=1/\sqrt{k}$ i. e. for $k=0.003$. This corresponds, for instance, to a frequency range from 30 cycles to 10 kc.

Figure 5:
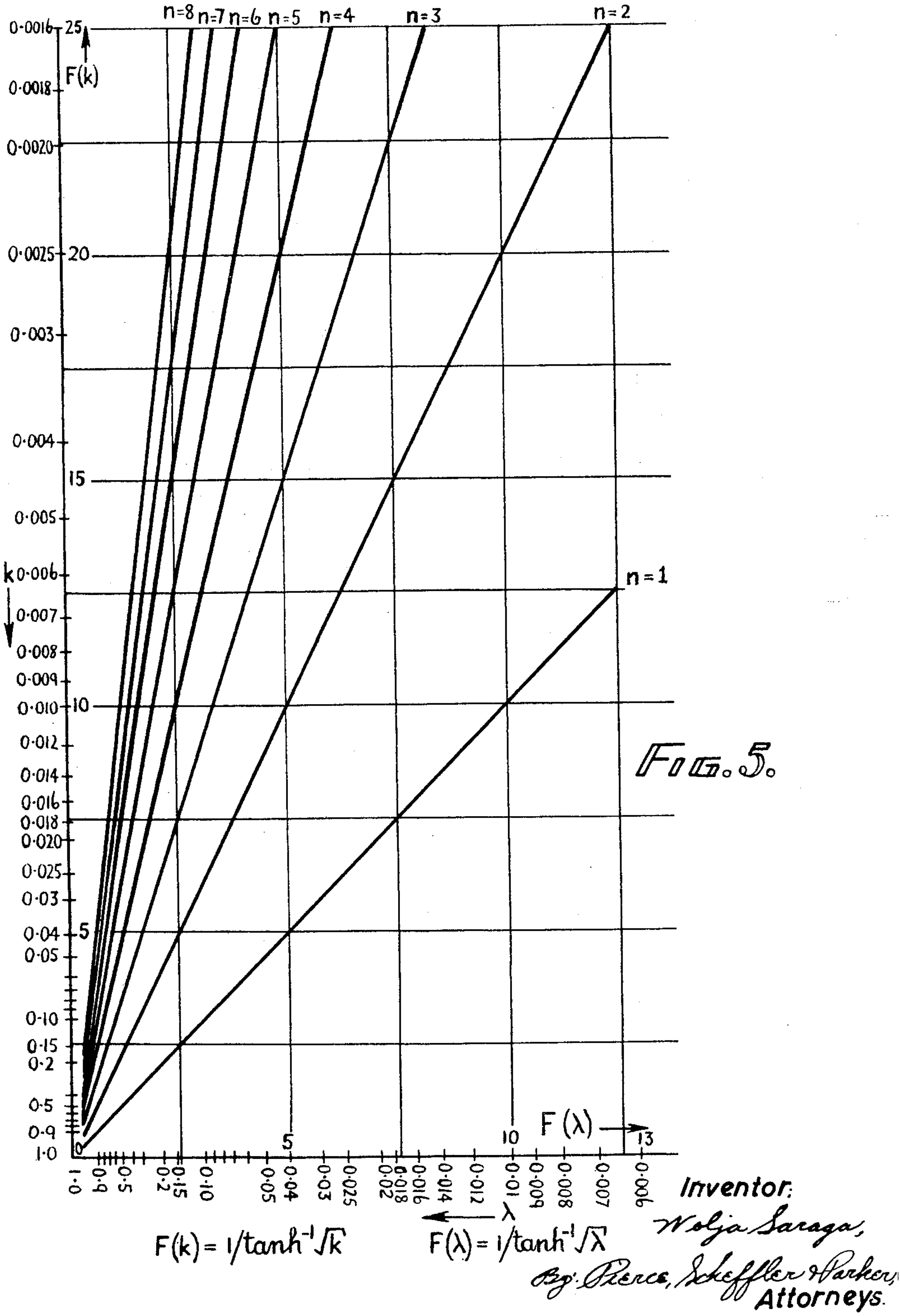

It will be seen from Equation $9b$ that if $x$ is replaced by $1/x$, $y_n$ remains unchanged for even $n$-values and is replaced by $1/y_n$ for odd values of $n$. The deviation of $|\log y_n|$ from 0 increases with $|\log x|$. If the limits of the $x$-range are denoted as $\sqrt{k}$ and $1\sqrt{k}$ and the limits of the $y$-range as $\sqrt{\lambda}$ and $1/\sqrt{\lambda}$ then $\lambda$ as a function of $k$ is given by $$\sqrt{\ }=\tanh n \tanh^{-1}\sqrt{k} \qquad (9e)$$

which, as far as the functional relation is concerned is similar to Equation $9a$. If Equation $9e$ is written in the form $$1/\tanh \sqrt{\lambda}=1/n(1/\tanh^{-1}\sqrt{k}) \qquad (9f)$$

it will be seen that $\lambda$ as a function of $k$ can be represented as a straight line with slope $1/n$ through the origin of the coordinate system for any $n$-value, if functional scales defined by the $1/\tanh^{-1}\sqrt{\ }$ function are used for $\lambda$ and $k$. This has been done in Figure 5. In view of the functional similarity between $9f$ and $9a$, Figure 5 also represents $y_n$ as a function of $x$, in other words Figure 5 can be looked upon as showing the same curves as Figure 4. It will be seen that if $k$ is given, $|\log \lambda|$ decreases with increasing $n$, i. e. the range of $y$ becomes smaller.

For synthesizing networks which have the performance described by Equation $9a$, the values of $x$ at which $y=+j$ must be found; reference will be made to this hereinafter. These values are given by $$x=j \tan [\pi/n(\tfrac{1}{4}+m)]$$
$$\text{where } m=0, 1, 2 \ldots (n-1) \qquad (9g)$$

*Tchebycheff approximations*

A Tchebycheff approximation is characterised by the fact that the maximum deviation occurring is a minimum. The theory of the transformation of elliptic functions very conveniently describes odd rational functions of $x$, symmetrical against a logarithmic $x$-scale about $x=1$, which over the range $x=\sqrt{k}$ to $x=1/\sqrt{k}$ approximate $y=1$, within the limits $\sqrt{\lambda}$ and $1/\sqrt{\lambda}$, in the Tchebycheff manner. As stated above, such limits for $y$ are equivalent to limits $\delta_{max}$ and $\delta_{min}=-\delta_{max}$ for the deviation $\delta$ of the phase difference $\psi$ from the required value 90°, and $$\tan \tfrac{1}{2}\,\delta_{max}=\frac{1-\sqrt{\lambda}}{1+\sqrt{\lambda}}$$

Elliptic functions are dealt with in a book by A. Cayley entitled "Elliptic Functions," published by G. Bell & Sons, London, Second Edition, 1895. This is the standard work, and it is convenient to use Cayley's notation. With this notation, it can easily be shown that the Tchebycheff approximation of the $n$-th order is given by $$y_n/\sqrt{\lambda}=sn(u/M,\lambda) \qquad (10a)$$

$$x/\sqrt{k}=sn(u, k) \qquad (10b)$$

The highest degree of $x$ occurring in the rational function defined by Equations $10a$ and $10b$ is $n$. Cayley uses the suffix $l$ for $\lambda$ and M to indicate that a "second transformation" from a modulus $k$ to a larger modulus $\lambda$ is meant. For the purposes of this specification it is convenient to use in many cases the suffix $n$ to denote the order of the transformation. Therefore, in order to avoid confusion, Cayley's suffix $l$ will not be used. For the purposes of this discussion it is also convenient to denote $\lambda$ sometimes as $k_n$. In Equations $10a$ and $10b$ $u$ is an auxiliary variable which is defined by Equation $10b$ and $y_n$ is defined in terms of $u$ by Equation 10$a$. $k$ has been defined above. $\lambda$ and M can be derived from $k$ as follows: $K^1/K$ is a function of $k$, say $K^1/K=F(k)$ known in the theory of elliptic functions. $\Lambda^1/\Lambda$ denotes the same function of $\lambda$ so that $\Lambda^1/\Lambda=F(\lambda)$. $\lambda$ can be obtained from $k$ by means of the relation $$\Lambda^1/\Lambda=\frac{1}{n}K^1/K \qquad (10c)$$

It will be shown that if $k$ is given, $|\log \lambda|$ decreases with increasing $n$, i. e. the range of $y$ becomes smaller. Furthermore K can be found as a function of $k$, and $\Lambda$ as the same function of $\lambda$, from Hayashi's tables. Then M is given by $$M=K/\Lambda \qquad (10d)$$

Figure 7:
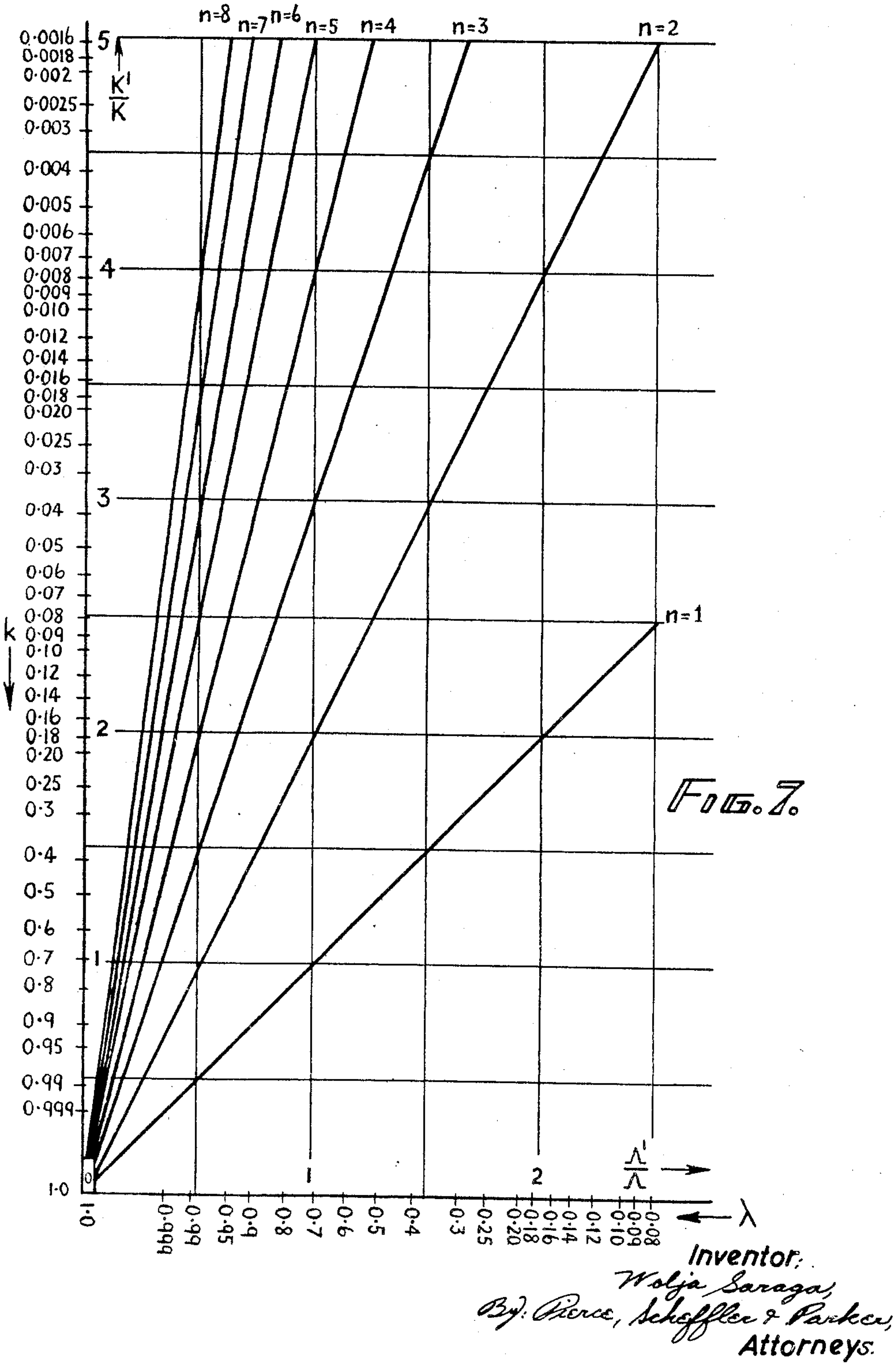

Thus $\lambda=k_n$ can be obtained for any $k$ and $n$, and, $k$ being specified, $n$ can be so chosen as to make $\text{Log}\sqrt{\lambda}$, which denotes the maximum deviation of $|\text{Log } y|$ from 0, as small as required. $\lambda$ as a function of $k$ and $n$ is represented in Figure 7. Since Equation 10$c$ is of the same form as Equation 9$f$ it is again possible to draw the $\lambda$ curves as straight lines with slope $1/n$ if linear scales for $K^1/K$ and $\Lambda^1/\Lambda$ are used. It sould be noted that in the case of Tchebycheff approximations the curves relating $\lambda$ to $k$ (Figure 7) do not at the same time relate $y_n$ to $x$. It will be seen that for any given $k$- and $n$-values the values of $\lambda$ obtained from Figure 7, i. e. for Tchebycheff approximations, are much nearer to 1 than those obtained from Figure 5 i. e. for Taylor approximations.

$y_n$ as a function of $x$ can be evaluated directly from Equations 10$a$ and 10$b$ by means of tables of elliptic functions. For this purpose Equations 10$a$ and 10$b$ can be modified as shown in Figure 9, which is a table of values and diagram, with relevant information. The Tchebycheff approximations for $n=1, 2 \ldots 6$ for an $x$-range from $\sqrt{k}$ to $1/\sqrt{k}$ where $k=0.003$ are shown diagrammatically in Figure 6. For these diagrams the formulae given in Figure 8 have not been used. Only the values at which maxima or minima of $y$ occur and those at which $y=1$ have been evaluated numerically, and the curves have been so drawn as to go through these points. However, for $n=4$ as will appear hereinafter a numerical check for a great number of points has shown very good agreement with the drawn curve. The curves have an oscillatory behaviour, all maxima and minima occur at the $y$-values $1/\sqrt{\lambda}$ and $\sqrt{\lambda}$ respectively, the value of $\lambda$ depending on the $n$-value and the $k$-value under consideration. For even $n$-values there are $\frac{1}{2}n$ maxima, $\frac{1}{2}(n-2)$ minima, two intersections with the line $y=\sqrt{\lambda}$ and $n$ intersections with the line $y=1$. For odd values there are $\frac{1}{2}(n-1)$ minima and $\frac{1}{2}(n-1)$ maxima, one intersection with the line $y=1/\sqrt{\lambda}$, one intersection with the line $y=\sqrt{\lambda}$ and $n$ intersections with the line $y=1$.

In order to be able to plot these characteristic points of $y$ it is necessary to know the values of $x$ at which $y_n=\sqrt{\lambda}$, 1 and $1/\sqrt{\lambda}$. On the other hand, in order to be able to write $y_n$ as a rational function of $x$ in the form of Equation 8$c$ it is necessary to know the values of $x$ at which $y_n=0$ and $y_n=\infty$ and the value of H in the case of even $n$-values (see below). Lastly in order to synthesize a network having a performance curve in accordance with $y$, the values of $x$ at which $y=+j$ must be found. All these values of $x$ can be found from Equations 10$a$ and 10$b$ by first inverting 10$a$ to find $u$ as a function of $y$ and then substituting this expression for $u$ in 10$b$. However, to simplify the engineering application of Tchebycheff approximations the $x$-values at which $y$ becomes $0, j, \infty, -j$ and $\sqrt{\lambda}$, 1, $1/\sqrt{\lambda}$ are listed in tables included in Figures 8, 10 and 11. The expressions tabulated are so regular in form that it is easy, if required, to extend by analogy the table to any $n$-value. The value H mentioned above is given by $$H=\sqrt{\lambda/k}/M_n \qquad (11)$$

When dealing with Tchebycheff approximations it is often convenient to make use of the "index law" which is valid for these approximations. Let $y_n(x, k)$ denote the $n$-th order approximation to $y_n=1$ over the $x$-range $\sqrt{k}$ to $1/\sqrt{k}$ and let $k_n$ denote the range of variation of $y_n(x, k)$ i. e. $y_n$ varies between $\sqrt{k_n}$ and $1/\sqrt{k_n}$. Furthermore, let $y_m(y_n, k_n)$ denote the $m$-th order approximation to $y_m=1$ over the $y_n$ range $\sqrt{k_n}$ to $1/\sqrt{k_n}$ and let $(k_n)_m$ denote the range of variation of $y_m$, i. e. $y_m$ varies between $\sqrt{(k_n)_m}$ and $1/\sqrt{(k_n)_m}$. Then $y_m(y_n, k_n)$ considered as a function of $x$ when $x$ varies from $\sqrt{k}$ to $1/\sqrt{k}$ is identical with $y_p(x, k)$, the $p$-th order approximation to $y_p=1$, over the $x$-range $\sqrt{k}$ to $1/\sqrt{k}$, if $p=mn$. This can be expressed formally by $$\left.\begin{aligned} y_m(y_n, k_n)&=y_p(x, k),\ p=mn \\ (k_n)_m&=k_p,\ p=mn \end{aligned}\right\} \qquad (12)$$

By virtue of the index law we can, if we have explored the case of $n=2$, apply all results obtained to $n=4=2\times2$ and $n=8=2\times4$. If $n=2$ and $n=3$ have been explored, the results can be combined to obtain the cases $n=6=2\times3$ and $n=9=3\times3$.

It is convenient to interpose at this point a generalising interpretation of the index law.

Both Equations 9$e$ and 10$c$, which give the deviation of $y$ from unity for a given range of $x$ and a given order $n$ for Taylor and Tchebycheff approximations, can be written in the form $$h(\lambda)=m+h(k)$$

where $m=\log_2 n$, and $h(\lambda)=\log_2 \tanh^{-1}\sqrt{\lambda}$, $h(k)=\log_2 \tanh^{-1}\sqrt{k}$ in the case of 9$e$ and $$h(\lambda)=\log_2\frac{\Lambda}{\Lambda^1}$$

$$h(k)=\log_2\frac{K}{K^1}$$

in the case of 10$c$. This means that in both cases $\lambda=k_n$ as a function of $k$ can be written in the form $$k_n=k_2{}^m(k)$$

where $k_2{}^m(k)$ means the $m$-th iteration of the function $k_2(k)$. Here "$m$-th iteration" refers not only to integral values but also to fractional values of $m$ since $m=\log_2 n$ is only integral if $n$ is an integral power of 2.

It is not possible to interpret in the same way the approximating function $y$ as an iterated function of $k$ because $y$ is not only a function of $k$, but of $x$ and $k$. However, if the concept of iteration is generalised so as to apply to functions of two variables, then $y_n$ can be regarded as $m$-th iteration of $y_2(x, k)$ where $m=\log_2 n$. This will now be shown.

Since $y_2(x, k)$ leads from two independent to one dependent variable, an iteration is only possible if there is introduced a second dependent variable, say an arbitrary function $z_2(x, k)$.

Then it is possible to define as $(y_2)^2$ and $(z_2)^2$ the functions $(y_2)^2 = y_2(y_2, z_2)$ and $$(z_2)^2 = z_2(y_2, z_2)$$

Furthermore it is possible to define iterated functions of $y_2^m$ and $z_2^m$ for integral as well as non-integral values of $m$ as functions $y_2^m = F(x, k, m)$ and $z_2^m = G(x, k, m)$ of three variables which satisfy the following relations.

$$\left.\begin{array}{l} F(x,k,l)=y_2(x,k) \quad G(x,k,l)=z_2(x,k) \\ F[F(x,k,m_1),G(x,k,m_1),m_2]=F[x,k,(m_1+m_2)] \\ G[F(x,k,m_1),G(x,k,m_1),m_2]=G[x,k,(m_1+m_2)] \end{array}\right\} (13)$$

Now if as arbitrary function $z_2(x, k)$ is chosen the function $k_2(k)$—which happens to be independent of $x$—it will be seen that the index law (Equation 12) can be expressed in the form of Equation 13 if $m = \log_2 n$ as before. In other words: $y_n$ and $k_n$ can be interpreted as the $m$-th iteration of $y_2$ and $k_2$ when regarded as a pair of functions of $x$ and $k$.

It is interesting to note that such an interpretation is also possible if instead of an approximation by a rational function the approximation by a polynomial is under consideration. If $y=0$ is to be approximated by the polynomial $$y_n = A_0 + A_1 x + \ldots + x^n$$

in the range $x=-\eta$ to $x=+\eta$, the $n$-th order Tchebycheff approximation is $$y_n = (\eta^n/2^{n-1}) \cos n \cos^{-1}(x/\eta)$$

and the $n$-th order deviation $\eta_n = 2^{1-n}\eta^n$. It is easy to show that $y_n = y_2^m(x, \eta)$ and $$\eta_n = \eta_2^m(x, \eta) = \eta_2^m(\eta)$$

*Alternative theory of Tchebycheff approximations*

So far the theory of Tchebycheff approximations has been discussed in terms of elliptic functions. This leads to the most concise and most general type of expressions. At the same time it must be realised that many engineers are unfamiliar with elliptic functions and that it is sometimes difficult to get hold of good tables of elliptic functions. It is therefore important to note that it is possible to formulate the approximations purely algebraically, without the use of elliptic functions. In practice a combination of the two methods of approach, appropriate to the particular case under consideration, is sometimes the best choice.

The algebraic theory for $n=2,4,8$ is very simple indeed. Starting with $n=2$, $y_2 = d_2x/1+x^2$ leads to the following relations: for $x=\sqrt{k}$ and $x=1/\sqrt{k}$, $y_2 = y_{2\,\min} = d_2\sqrt{k}/(1+k)$ and for $x=1$, $y_2 = y_{2\,\max} = \frac{1}{2}d_2$.

The condition $y_{2\,\min} y_{2\max} = 1$ leads to $$k_2 = 2\sqrt{k}/(1+k)$$

and $d_2 = 2/\sqrt{k_2}$. With this value for $d_2$, $y_2$ is the Tchebycheff approximation of the second order for the range $k$. The cases $n=4$ and $n=8$ can be discussed by applying the index law. The results are tabulated in the table which is included in Figure 12.

For $n=3$ the derivation of an expression for $y_3$ is less simple. Starting with an expression of the form $y_3 = Hx(A_0+x^2)/(B_0+x^2)$, which in order to be symmetrical about $x=1$ simplifies to $$y = \frac{x(a+x^2)}{1+ax^2}$$

it is necessary then to determine $a$ so that, for a given range $k$, $y$ behaves in a Tchebycheff manner. $Y$ is required to be equal to $\sqrt{\lambda}$ if $x=\sqrt{k}$; furthermore $y$ has also the value $\sqrt{\lambda}$ as a minimum value at an unknown $x$—value, say $x=b$. Therefore $$y - \sqrt{\lambda} = [x(a+x^2) - \sqrt{\lambda}(1+ax^2)]/(1+ax^2)$$

must be equal to $(x-\sqrt{k})(x-b)^2/(1+ax^2)$

Comparing coefficients there are obtained three equations:

$$a\sqrt{\lambda} = \sqrt{k} + 2b,\ a = b^2 + 2b\sqrt{k} \text{ and } \sqrt{\lambda} = b^2\sqrt{k}$$

If there is introduced $\alpha$, a term used by Cayley, by means of $b=\sqrt{k}/\alpha$ then $$a = k/\alpha^2 + 2k/\alpha \qquad (14a)$$

and $$k^2 = \alpha^3\frac{2+\alpha}{1+2\alpha},\quad \lambda^2 = \alpha\left(\frac{2+\alpha}{1+2\alpha}\right)^3 \qquad (14b)$$

Equations 14$a$ and 14$b$ determine $\alpha$, $a$ and $\lambda$ in terms of $k$ ($\lambda$ can also be determined by means of tables of elliptic functions, or by means of a graph such as that of Figure 7). Thence $b^2 = \sqrt{\lambda}/k$ can be found, and thus $y$ is known as a function of $x$, and also the following details:

$y = \sqrt{\lambda}$ if $x = \sqrt{k}$ and $x = b$
$y = 1/\sqrt{\lambda}$ if $x = 1/\sqrt{k}$ and $x = 1/b$
$y = 1$ if $x = 1$ and $x = \frac{1}{2}(a-1) \pm \sqrt{\frac{1}{4}(a-1)^2 - 1}$ If in the discussion of the case $n=3$ the independent variable $x$ is replaced by the 2nd order approximation $y_2$ and $k$ by $k_2$, a 6th order approximation is obtained, and by repeating this process a 12th order approximation is obtained. If in the discussion of the case $n=3$, $x$ is replaced by $y_3$ and $k$ by $k_3$ the 9th order approximation is obtained. For the prime numbers $n=5$, 7, 11 . . . etc., however, the algebraic theory becomes progressively more difficult.

*Network synthesis*

At this stage it will be assumed that in one way or another a suitable performance function $y(x)$ has been determined. The next step is the determination of two phase shift networks which will produce this function $y$. The problem to be solved is to find $$\frac{X_1}{R_0} \text{ and } \frac{X_2}{R_0}$$

when $$y = \frac{(X_1/R_0) - (X_2/R_0)}{1 + (X_1/R_0)(X_2/R_0)}$$

is known. As this problem occurs also in the design of symmetrical filters where (see Equation 6$b$)

$$\frac{1 + (X_A/R_0)(X_B/R_0)}{(X_A/R_0) - (X_B/R_0)}$$

is given and $X_A/R_0$ and $X_B/R_0$ have to be found as physically possible reactances, that solution can be applied to the present problem. S. Darlington in Bell Monograph B-1186 "Synthesis of reactance 4-poles which produce prescribed insertion loss characteristics" gives the following instructions for determining the reactances (modified here in accordance with the symbols herein used): Write $y$ in the form $y = xB^1/P$ where $B^1$ and $P$ are polynomials in $x^2$. Then express $P + pB^1$ in the form $(P_1 + pB_1)(P_2 - pB_2)$ where $P_1$, $B_1$, $P_2$, $B_2$ are even polynomials in $p=jx$, such that the roots of $P_1+pB_1=0$ are the roots of $P+pB^1=0$, (i. e. $y=+j$) which have negative real parts. Then $jX_1/R_0=pB_1/P_1$ and $jX_2/R_0=pB_2/P_2$.

Darlington's instructions, given by him without explicit proof, can be modified in a way which includes the proof. For this purpose consider those values of $x$ at which $y=\tan \frac{1}{2}(\beta_1-\beta_2)=j$; at these values, say $x=x_j$, the phase shift difference $\frac{1}{2}(\beta_1-\beta_2)$ approaches $+j\infty$ which must be due to $\frac{1}{2}\beta_1$ tending towards $+j\infty$ or $\frac{1}{2}\beta_2$ tending towards $-j\infty$. Now assume that the two basic phase shift networks with series reactances $X_1$ and $X_2$ (see Figure 1) consist of "elementary" phase shift sections in tandem, each section being characterised by its phase shift $\beta$ and its normalised series arm reactance $\bar{a}x=\tan \frac{1}{2}\beta$ or its normalised series arm inductance $\bar{a}$.

Such elementary sections are indicated in Figure 13, which is a network of the type shown in Figure 1, and in which the reactance values are as shown. In passing it may be pointed out that in the general case of breaking-down a phase shift network in this way the individual $\bar{a}$-values obtained are not necessarily real but may occur in conjugate complex pairs. Then the two corresponding elementary sections can be combined to one physical section with normalised series arm reactance $ax/(1-bx^2)$ where $a^2<4b$. However, in the case of phase splitting networks, complex $\bar{a}$=values do not ocurc if a Taylor or Tchebyscheff approximation is used for the performance curve, and they do not seem to occur in other good approximations. On the other hand, their occurrence is the rule in filter design.

Figure 6:
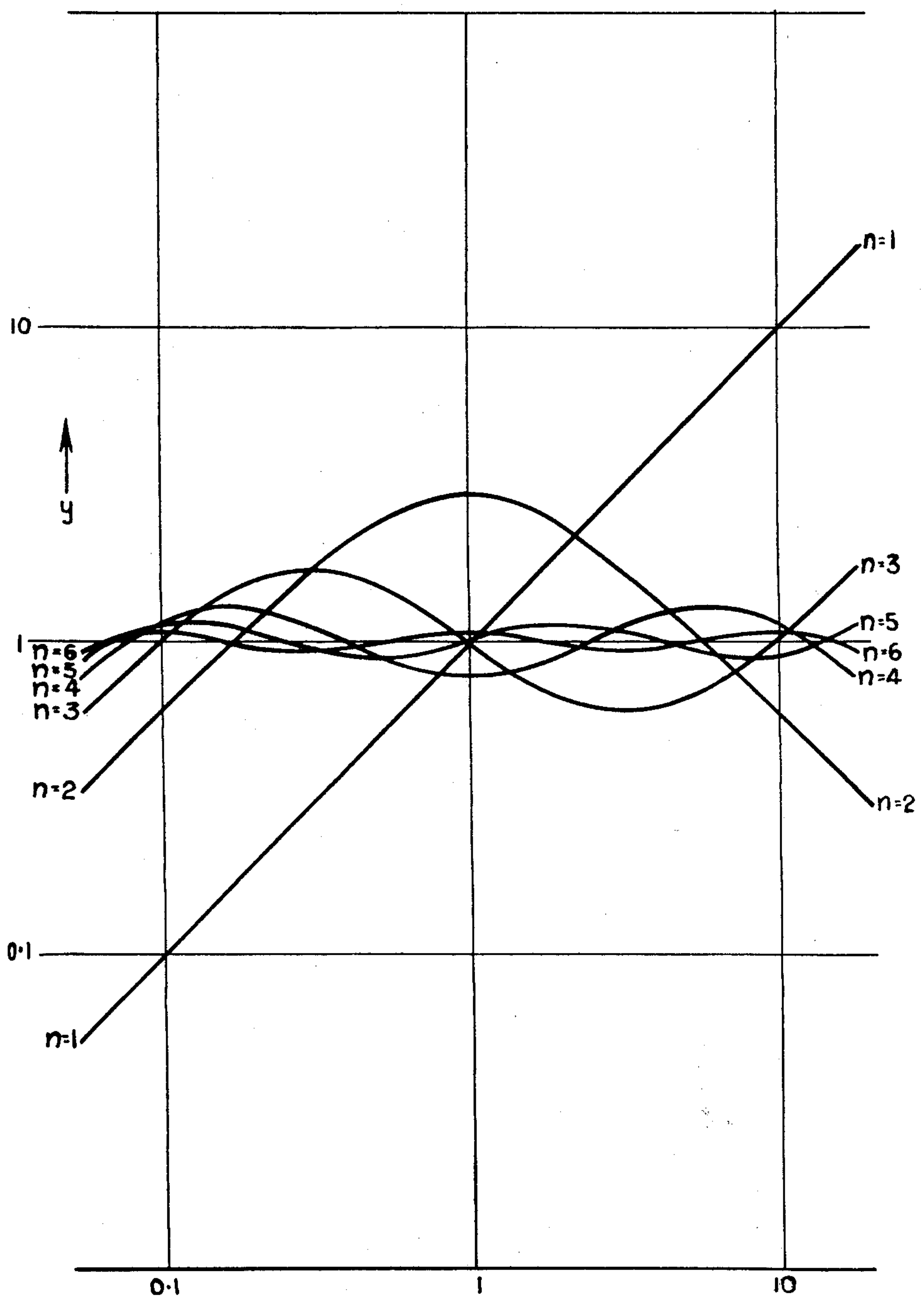

In Figure 6, at each $x_j$ one of these elementary phase angles $\frac{1}{2}\beta$ must tend to $+j\infty$ and $$\tan \tfrac{1}{2}\beta=j$$

if $\beta$ is a constituent of $\beta_1$ or to $-j\infty$ and $$\tan \tfrac{1}{2}\beta=-j$$

if $\beta$ is a constituent of $\beta_2$. Since $$\tan \tfrac{1}{2}\beta=\bar{a}x, \bar{a}=\pm j/x_j$$

That sign which makes $\bar{a}$, the normalised inductance, positive is selected. If, in order to obtain a positive $\bar{a}$ it is necessary to take the positive sign, the corresponding $\beta$ is a constituent of $\beta_1$, whereas in the other case there is obtained a constituent of $\beta_2$. In this way not only are $X_1$ and $X_2$ found, but also, at the same time, the constituent elementary sections forming the two basic phase shift networks. It can be shown that forming the expressions for $X_1$ and $X_2$ from the inductances of the elementary phase shift sections in accordance with the addition theorem of the tan-function leads to the expressions given by Darlington.

It will be seen that $n$ elementary sections lead to an expression for $y$ in which the highest degree of $x$ is $n$, and vice versa. Thus the number of network elements increases with the highest degree of $x$ occurring.

*Practical design examples*

It is considered that in selecting practical examples it is best to take simple ones, as then the method of obtaining the networks can be shown most clearly. The first example will be a case in which a Taylor approximation is required, selecting a simple case, namely $n=3$. Then the best approximation is given by $$y_3=\frac{3x+x^3}{1+3x^2} \qquad (15)$$

(see Equation 9d). Since $n$ is odd, the number of sections of the two phase shifting networks must differ by one. Assume that the network with $X_1$ consists of two sections, say with series arm inductances $\bar{a}_1$ and $\bar{a}_2$ respectively. Then the network with $X_2$ has one single section, say with series arm inductance $\bar{a}_3$. Thus $$\tan \tfrac{1}{2}\beta_1=\frac{(\bar{a}_1+\bar{a}_2)x}{(1-\bar{a}_1\bar{a}_2x^2)},\quad \tan \tfrac{1}{2}\beta_2=\bar{a}_3x$$

and $$y=\tan \tfrac{1}{2}(\beta_1-\beta_2)=\frac{(\bar{a}_1+\bar{a}_2-\bar{a}_3)x+\bar{a}_1\bar{a}_2\bar{a}_3x^3}{1+(\bar{a}_2\bar{a}_3+\bar{a}_3\bar{a}_1-\bar{a}_1\bar{a}_2)x^2} \qquad (16)$$

In this simple case $\bar{a}_1$, $\bar{a}_2$, $\bar{a}_3$ can be obtained by comparing coefficients in 14 and 15. Then $$\bar{a}_1+\bar{a}_2-\bar{a}_3=3;\quad \bar{a}_1\bar{a}_2\bar{a}_3=1;\quad \bar{a}_2\bar{a}_3+\bar{a}_3\bar{a}_1-\bar{a}_1\bar{a}_2=3$$

By substituting a cubic equation is obtained for $\bar{a}_3$ with one positive root: $\bar{a}_3=+1$. Then $$\bar{a}_1=2+\sqrt{3},\ \bar{a}_2=2-\sqrt{3} \text{ and } X_1/R_0=\frac{4x}{1-x^2},\ X_2/R_0=x$$

$X_1$ and $X_2$ can be interchanged. In a more complicated case the equation $y=+j$ would be solved to obtain the three roots $x=-j$, $x=+j(2+\sqrt{3})$ and $$x=+j(2-\sqrt{3})$$

either by means of Equation 9g or algebraically. In view of the signs of the roots the first one must correspond to $X_2$ and the other two must correspond to $X_1$. Thus $\bar{a}_1=2+\sqrt{3}$, $\bar{a}_2=2-\sqrt{3}$ and $\bar{a}_3=+1$ are obtained as before.

The second example will be a case in which a Tchebycheff approximation is required, taking $n=4$ so that an algebraic method can be used as well as the transformation of elliptic functions for obtaining the network elements. The specified $x$-range is assumed to be from $x=\sqrt{k}$ to $x=1/\sqrt{k}$ where $k=0.003$. This corresponds to a frequency range from 30 cycles to 10 kc. Then by means of Hayashi's tables $k_4=\lambda$ is found to be 0.5959. The $y$-curve is shown in Figure 6. Table II gives the expressions for the four $x$-values at which $y=+j$. Then using Milne-Thomson's tables, the following values are obtained.

$$x=+j2.469,\ x=-j/2.469,\ x=+j0.05618,\ x=-j/0.05618$$

Then for one phase shift network $\bar{a}_1=2.469$, $\bar{a}_2=0.05618$ and for the other network $$\bar{a}_3=1/\bar{a}_2=17.80$$

$\bar{a}_4=1/\bar{a}_1=0.4049$. From these values of $\bar{a}_1$, $\bar{a}_2$, $\bar{a}_3$, $\bar{a}_4$ are found:

$$X_1/R_0=2.526x/(1-0.1387x^2),\quad X_2/R_0=18.20x/(1-7.208x^2)$$

and $y_4=15.68x(1+x^2)/(1+38.62x^2+x^4)$. $X_1$ and $X_2$ can be interchanged. Applying the algebraic theory, Figure 12 gives $d_2=6.052$, $d_4=2.591$, $k_4=\lambda=0.5959$ and $$y_4=d_4d_2x(1+x^2)/[1+(2+d_2^2)x^2+x^4]=15.68x(1+x^2)/[1+38.62x^2+x^4]$$

as before.

*Alternative phase shift networks*

Figure 15:
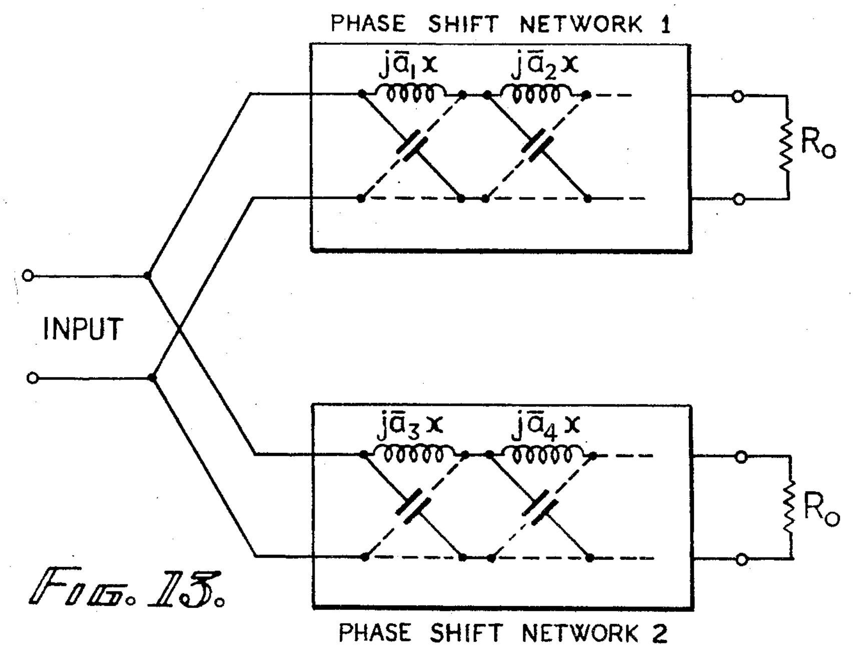

The foregoing has been based on conventional constant resistance phase shift networks with series arm reactances X and lattice arm reactances $-R_0^2/X$, inserted between equal resistances $R_0$, where the phase shift is $\beta=2\tan^{-1}X$. It is possible to alter one of these resistances without altering the phase shift; then a basic "flat loss" occurs, that is the attenuation is increased uniformly through the frequency range by a given amount in the manner indicated in Figure 14. It has been shown that it is possible to replace the two lattice arm reactances by resistances $R_0$ without altering the phase shift in the manner indicated in Figure 15. Then, if the source and load resistance are both equal to $R_0$, a flat loss of 6 db is produced.

Figure 17:
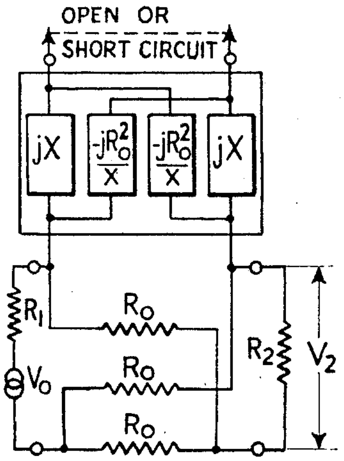
Figure 18:
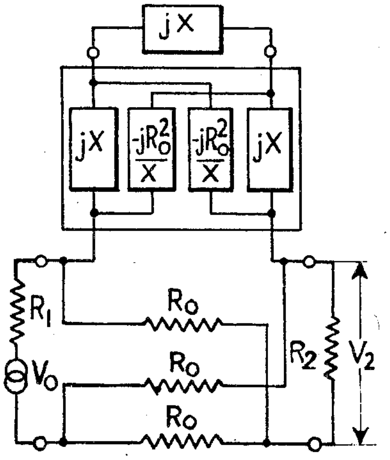

It is possible to make the source resistance $$\frac{1}{\eta}R_0$$

and the load resistance $\eta R_0$, when an additional flat loss depending on $\eta$ is produced, but the phase shift is still unaltered. It is possible to replace one of the two remaining reactive arms by a resistance $R_0$ without altering the phase shift, in the manner shown in Figure 16. Then, if $\eta=1$, the basic loss is 12 db instead of 6 db. Two other types of phase shift networks, shown respectively in Figures 17 and 18 can be shown to be special cases of the network of Figure 16 but with more reactive elements than are necessary for producing the phase shift actually produced. The circuit in Figure 16 can be replaced in known manner by a hybrid circuit. A number of so-called half-lattice networks which are driven from a balanced source, are also known.

*Dissipation-compensated phase shift networks*

The effect of dissipation in the elements of a phase shift network is to distort the phase characteristic and to produce an attenuation varying with frequency. If the Q-values of the different components are not the same the impedance is also affected. Suggestions have been made in the past for compensating for dissipation in the elements of a network, one such suggestion being in the monograph by Darlington referred to above. The present invention envisages arrangement for compensating for such dissipation, and it is a feature of the invention that this is applicable to phase shift networks in general.

Figure 19:
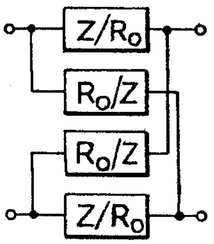
Figures 19, 20 and 21 are circuit diagrams for use in connection with the design of dissipation-compensated networks.

This feature of the invention can be considered as follows. Since any phase shift network can be built as a tandem combination of one- and two-parameter phase shift networks it is sufficient to consider the dissipation compensation of such networks. The basic idea of the method is to consider only networks which contain a resistance in series with each inductance and a resistance in parallel with each capacitance so that these resistances can take up the dissipation resistances of reactive elements, and to design these networks so that they have the required phase characteristic $\beta$ and a flat loss $\alpha_0$. Consider for example the lattice network shown in Figure 19; in this case the transfer constant $\theta=\alpha+j\beta$ is given by $\tanh \frac{1}{2}\theta=Z/R_0$. For the one-parameter type of phase shifting network without dissipation $$Z/R_0=j\bar{a}x$$

as indicated in Figure 20*a* and $\tan \frac{1}{2}\beta=\bar{a}x$, $\alpha=0$. The object is to find an impedance Z with resistances as stated above so that $$Z/R_0=(C+j\bar{a}x)/(1+jC\bar{a}x)$$

where $C=\tanh \frac{1}{2}\alpha_0$ and $\alpha_0$ is the basic loss of the network. It can easily be shown that the network in Figure 20*b* represents an impedance Z of this form. Its elements will be positive if Q is not too small.

Now consider the two-parameter phase shift network (without dissipation) in which $Z/R_0$ is as shown in Figure 21*a*. Then $$Z/R_0=jax/(1-bx^2)$$

and $\alpha=0$, $\tan \frac{1}{2}\beta=ax/(1-bx^2)$. It is necessary to find an impedance Z with resistance as stated above so that $$U/R_0=[C+jax/(1-bx^2)]/[1+jCax/(1-bx^2)]$$

It can be shown that the two networks shown in Figures 21*b* and 21*c* have this impedance if the relations stated in these figures are satisfied. In Figure 21*c* it is, of course, possible to absorb the resistance $FR_0$ in $Z_1R_0$ or $DR_0^2/Z_1$. It will be seen that the resistance $FR_0$ is negative in Figure 21*b* if $a^2>4b$ and negative in Figure 21*c* if $a^2<4b$. In Figure 21*c* $F<0$ does not make the network necessarily nonphysical.

Figure 20:
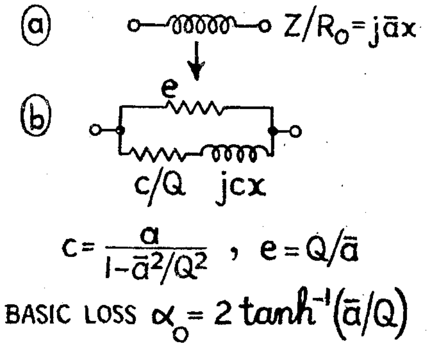
Figure 21:
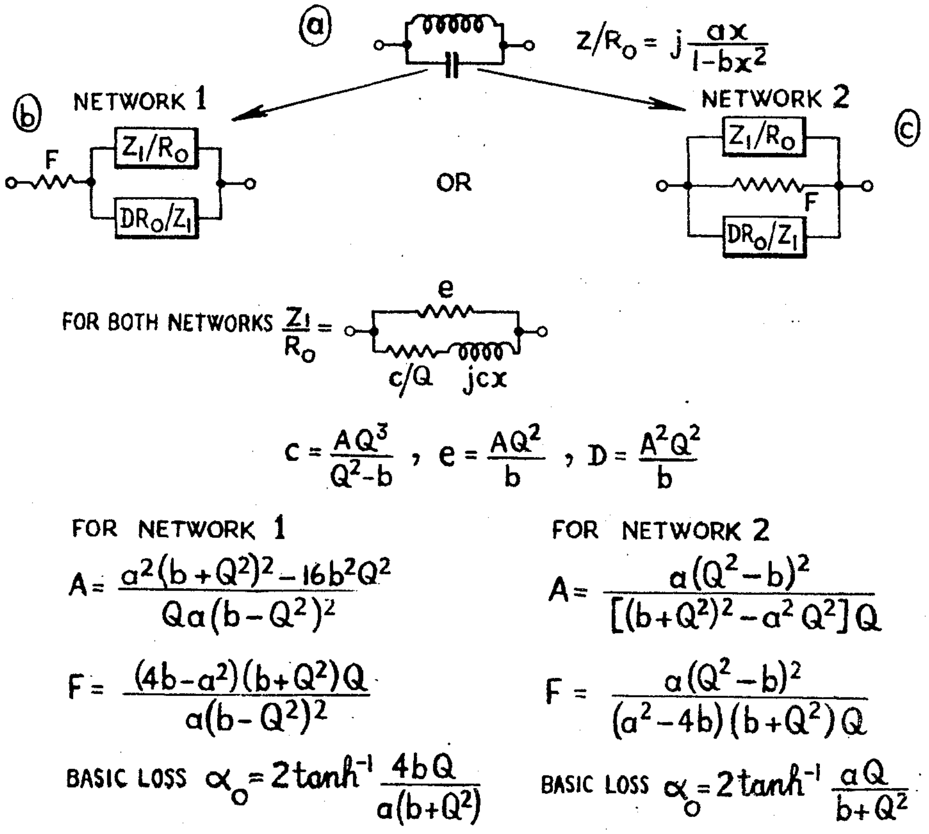

If $a^2\geq 4b$ the phase shift network defined by the series arm reactance in Figure 21*a* can be replaced by two simpler networks of the type defined by the series impedance in Figure 20*a*. As mentioned above only the case $a^2\geq 4b$ seems to occur in phase splitting problems but the other case has been treated here also since the three transformations, described with reference to Figures 20 and 21 together make it possible to transform any given phase shift network into a dissipation compensated one.

I claim:

1. An electrical phase splitting network comprising a pair of input terminals, and two pairs of output terminals, said network serving to produce from an input applied to said input terminals an output at each of said pairs of output terminals, said outputs having a phase difference $\psi$ which is approximately constant, and approximately equal to $2\tan^{-1} y_0$ where $y_0$ is a specified constant, over a wide frequency band extending from a lower frequency $f_1$ to a higher frequency $f_2$, and comprising two separate component phase-shifting networks having respectively phase shifts $\beta_1$ and $\beta_2$ such that $(\beta_1-\beta_2)$ is equal to $\psi$, the phase difference $\psi$ being defined as a function of the normalized frequency $x=f/f_0$, where $f$ is the frequency and $f_0=\sqrt{f_1f_2}$, by the relation $$y=\tan \tfrac{1}{2}\psi=sn\left(u\frac{k}{\Lambda}, \lambda\right)$$

where the variable $u$ is defined by the relation $$x=\sqrt{k}\ sn(u,k)$$

and $sn$ is the symbol for the elliptic sine function, $x$ being related to $u$ by such a function with modulus $k$, and $\tan \frac{1}{2}\psi$ being defined by an elliptic sine function with modulus $\lambda$ the modulus $k$ being equal to the frequency ratio $f_1f_2$ and the modulus $\lambda$ being obtained from $k$ by means of the relation $$\frac{\Lambda}{\Lambda_1}=n\cdot\frac{k}{k_1}$$

where $\Lambda, \Lambda_1, k, k_1$, are the real quarter periods of elliptic sine functions with moduli $\lambda, \lambda_1, k, k_1$ respectively, and $\lambda^1=+\sqrt{1-\lambda^2}$ and $k^1=\sqrt{1-k^2}$, and where $n$ indicates the chosen order of approximation of $\psi$ to $2\tan^{-1} y_0$ and is an integral number equal to 3, 4, 5 etc., the said approximation being a Tchebyscheff approximation over the range $x_1=f_1/f_0$ to $x_2=f_2/f_0$, where $f_0=\sqrt{f_1f_2}$, the said component phase shift networks consisting of the equivalent, so far as their phase-frequency characteristic is concerned, of at least three elementary constant resistance phase shift networks, the total number of said elementary networks being $n$, and their normalized series arm reactances being $\bar{a}x$, where $\bar{a}=\pm j/x_j$ and $x_j$ are the roots of the equation $y=+j$, and where the positive or negative sign in the expression $\pm j/x_j$ is such that $\bar{a}$ is always positive, the component phase splitting networks being composed one by elementary networks, in tandem, corresponding to the positive sign in said expression, and the other network by the elementary networks corresponding to the negative sign in said expression.

2. An electrical phase splitting network comprising a pair of input terminals, and two pairs of output terminals, said network serving to produce from an input applied to said input terminals an output at each of said pairs of output terminals, said outputs having a phase difference $\psi$ which is approximately constant, and approximately equal to $2\tan^{-1} y_0$ where $y_0$ is a specified constant, over a wide frequency band extending from a lower frequency $f_1$ to a higher frequency $f_2$, and comprising two separate component phase-shifting networks having respectively phase shifts $\beta_1$ and $\beta_2$ such that $(\beta_1-\beta_2)$ is equal to $\psi$, the phase difference $\psi$ being defined as a function of the normalized frequency $x=f/f_0$, where $f$ is the frequency and $f_0=\sqrt{f_1f_2}$, by the relation $$y=\tan \tfrac{1}{2}\psi=y_0 \tanh [n \tanh^{-1} x]$$

where $n$ indicates the chosen order of approximation of $\psi$ to $2\tan^{-1} y_0$ and is an integral number equal to 3 or more, the approximation being a Taylor maximally flat approximation at the geometric midband point $x=1$, the said component phase shift networks consisting of the equivalent so far as their phase-frequency characteristics is concerned, of at least three elementary constant resistance phase shift networks, the total number of said elementary networks being $n$, and their normalized series arm reactances being $\bar{a}x$, where $\bar{a}=\pm j/x_j$ and $x_j$ are the roots of the equation $y=+j$, and where the positive or negative sign in the expression $\pm j/x_j$ is such that $\bar{a}$ is always positive, the component phase splitting networks being composed one by elementary networks, in tandem, corresponding to the positive sign in said expression, and the other network by the elementary networks corresponding to the negative sign in said expression.

3. An electrical phase splitting network comprising a pair of input terminals, and two pairs of output terminals, said network serving to produce from an input applied to said input terminals outputs at both of said pairs of output terminals said network comprising two component phase splitting networks composed of a total of $n$ elementary phase shift networks each being the equivalent so far as their phase-frequency characteristic is concerned of elementary constant resistance phase shift lattice networks consisting of two equal inductances in their series arms and two equal capacitances in their lattice arms, the two said outputs having a phase difference $\psi$ which is approximately constant, and approximately equal to $2\tan^{-1} y_0$ where $y_0$ is a specified constant, over a wide frequency band extending from a lower frequency $f_1$ to a higher frequency $f_2$, said component phase-shifting networks having respectively phase shifts $\beta_1$ and $\beta_2$ such that $(\beta_1-\beta_2)$ is equal to $\psi$, the phase difference $\psi$ being defined as a function of the normalized frequency $x=f/f_0$, where $f$ is the frequency and $f_0=\sqrt{f_1f_2}$, by the relation $$y=\tan \tfrac{1}{2}\psi=y_0\sqrt{\lambda}\, sn\left(\frac{uk}{\Lambda}, \lambda\right)$$

where the variable $u$ is defined by the relation $$x=\sqrt{k}\, sn(u,k)$$

and $sn$ is the symbol for the elliptic sine function, $x$ being related to $u$ by such a function with the modulus $k$, and $\tan \tfrac{1}{2}\psi$ being defined by an elliptic sine function with modulus $\lambda$, the modulus $k$ being equal to the frequency ratio $f_1/f_2$ and the modulus $\lambda$ being obtained from $k$ by means of the relation $$\frac{\Lambda}{\Lambda_1}=n\cdot\frac{k}{k_1}$$

where $\Lambda$, $\Lambda_1$, $k$, $k_1$, are the real quarter periods of elliptic sine function with moduli $\lambda$, $\lambda_1$, $k$, $k_1$, respectively and $\lambda^1=+\sqrt{1-\lambda^2}$ and $k^1=\sqrt{1-k^2}$; and where $n$ indicates the chosen order of approximation of $\psi$ to $2\tan^{-1} y_0$ and is an integral number equal to 3 or more, the said approximation being a Tchebysceff approximation over the range $x_1=f_1/f_0$ to $x_2=f_1/f_0$, where $f_0=\sqrt{f_1f_2}$, the normalized series arm reactances of said elementary networks being $\bar{a}x$, where $\bar{a}=\pm j/x_j$ and $x_j$ are the roots of the equation $y=+j$, and where the positive or negative sign in the expression $\pm j/x_j$ is such that $\bar{a}$ is always positive, the component phase splitting networks being composed one by elementary networks, in tandem, corresponding to the positive sign in said expression, and the other network by the elementary networks corresponding to the negative sign in said expression, the said inductances and capacitances of the elementary networks being completely determined by the values of $\bar{a}$ as defined above.

4. An electrical phase splitting network comprising a pair of input terminals, and two pairs of output terminals, said network serving to produce from an input applied to said input terminals outputs at both of said pairs of output terminals said network comprising two component phase shifting networks the equivalent so far as their phase-frequency characteristic is concerned of a total of $n$ elementary constant resistance phase shift lattice networks consisting of two equal inductances in their series arms and two equal capacitances in their lattice arms, the two said outputs having a phase difference $\psi$ which is approximately constant, and approximately equal to $2\tan^{-1} y_0$ where $y_0$ is a specified constant, over a wide frequency band extending from a lower frequency $f_1$ to a higher frequency $f_2$, said component phase-shifting networks having respectively phase shifts $\beta_1$ and $\beta_2$ such that $(\beta_1-\beta_2)$ is equal to $\psi$, the phase difference $\psi$ being defined as a function of the normalized frequency $x=f/f_0$, where $f$ is the frequency and $f_0=\sqrt{f_1f_2}$, by the relation $$y=\tan \tfrac{1}{2}\psi=y_0 \tanh [n \tanh^{-1}x]$$

where $n$ indicates the chosen order of approximation of $\psi$ to $2\tan^{-1} y_0$ and is an integral number equal to 3 or more, the approximation being a Taylor maximally flat approximation at the geometric midband point $x=1$, the normalized series arm reactances of said elementary networks being $\bar{a}x$, where $\bar{a}=\pm j/x_j$ and $x_j$ are the roots of the equation $x=+j$, and where the positive or negative sign in the expression $\pm j/x_j$ is such that $\bar{a}$ is always positive, one component phase splitting networks being composed by elementary networks, in tandem, corresponding to the positive sign in said expression, and the other network by the elementary networks corresponding to the negative sign in said expression, the said inductances and capacitances of the elementary networks being completely determined by the values of $\bar{a}$ as defined above.

WOLJA SARAGA.

References Cited in the file of this patent

UNITED STATES PATENTS

| Number | Name | Date |
|---|---|---|
| 2,024,900 | Weiner et al. ------ | Dec. 17, 1935 |
| 2,529,117 | Tompkins ---------- | Nov. 7, 1950 |